Jan. 28, 1969  W. DERBFUSS  3,424,024
CONTROL TRANSMISSION
Filed Dec. 12, 1966  Sheet 1 of 2

INVENTOR

Wolfgang Derbfuss

BY Bailey, Stephens and Huettig
ATTORNEYS

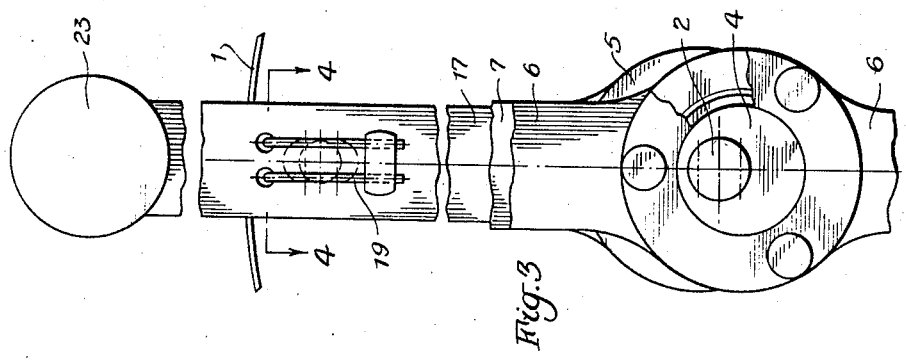
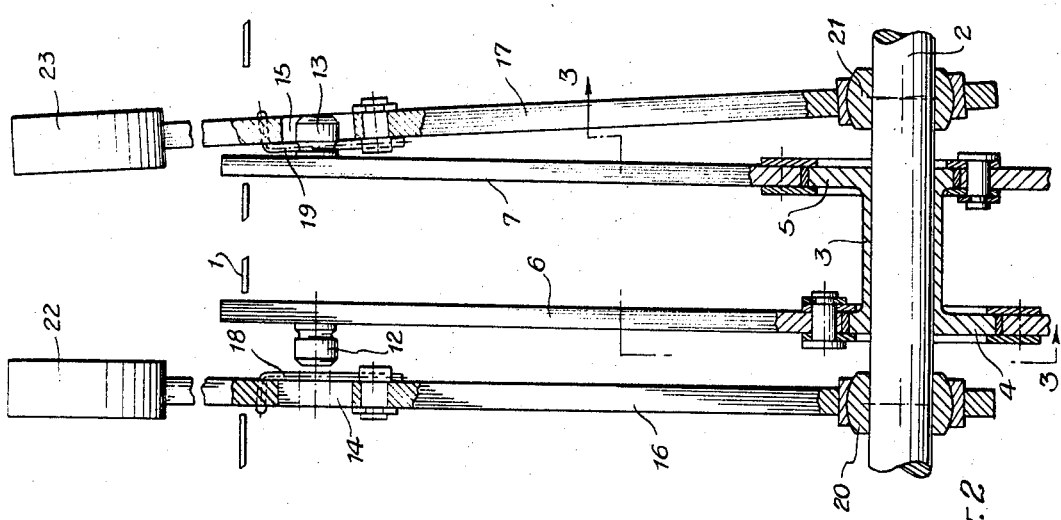
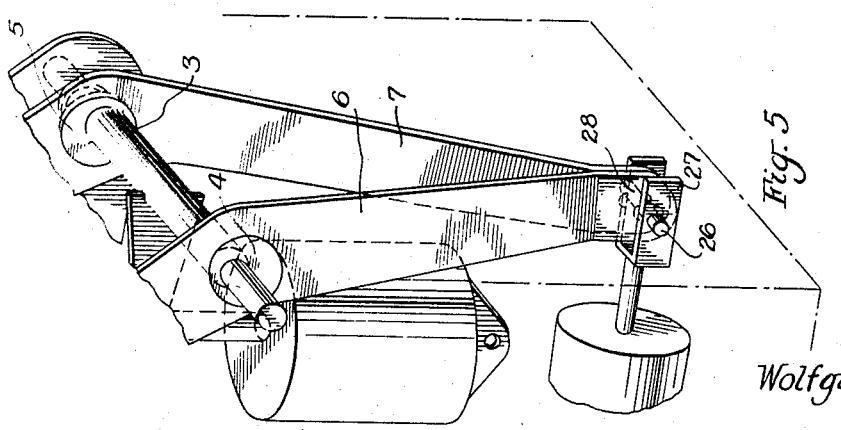
INVENTOR
Wolfgang Derbfuss

United States Patent Office 3,424,024
Patented Jan. 28, 1969

3,424,024
CONTROL TRANSMISSION
Wolfgang Derbfuss, Munich, Germany, assignor to
M.A.N. Turbo GmbH, Munich-Allach, Germany
Filed Dec. 12, 1966, Ser. No. 600,797
Claims priority, application Germany, Dec. 21, 1965,
M 67,714; July 28, 1966, M 70,380
U.S. Cl. 74—480        10 Claims
Int. Cl. G05g 9/00, 11/00

ABSTRACT OF THE DISCLOSURE

The throttles for two or more engines are inter-connected by cam actuated levers for movement of the controls in either the same direction or in counter rotation direction.

---

During operation of an aircraft it will occasionally be necessary for two components to operate via a common control linkage causing the same directional motions for one particular flight condition and opposing motions for another flight condition.

For instance, German Patent No. 1,132,440 discloses a VTOL aircraft, the wing tips of which being provided with engines rotatable about a lateral axis of the aircraft. During transition from vertical to horizontal flight, the two engines are required to move in the same sense of rotation about the lateral axis of the aircraft. In order to compensate for yawing movements of the aircraft about its yaw axis, however, it will be necessary for the two engines to be counter rotating about the lateral axis of the aircraft.

Said disclosure particularly applies to a fuel control unit for, at least, two combustion engines working on one output shaft, especially gas turbine engines, which are equipped with one governor each, and where, in accordance with the copending U.S. application of Greune, Ser No. 564,233, filed July 11, 1966, now Patent No. 3,365,882, the selector devices for the speed nominal value of all governors, designed as the selector devices for the proportional action controllers, are to be operated by controls that are automatically controlled, via an actuator unit, to a predetermined schedule as a function of operating data of the whole power plant, i.e., load distribution for individual engines and output shaft speed.

With this type of arrangement, the same directional motion of the controls is initiated whenever the output shaft r.p.m. deviates from nominal speed. If the torque values of the two combustion engines become mismatched, however, then torquemeter transmitters will cause the controls to pivot in an opposite direction. With the aid of the other engine components effected by the controls, such as governors, injection pumps, etc., the relevant nominal operating condition of the two combustion engines will then be restored. As a rule, this will require superpositioning of two control actions, as experienced from the characteristics of gas turbine engines. When the torque values of both engines are matched at a particular speed, they become mismatched as soon as the nominal speed is not maintained, necessitating control actions to match both torque and speed. The controls will thus have to be caused to move in the same direction, but these same directional motion components could also involve counter-rotating pivoting components, whereby the actual motion would be the resultant of the two motion components.

It is the object of this invention to provide for an actuating mechanism for such applications, particularly in the latter case, using unsophisticated, reliable components characterized by most accurate actuating movements and a compact, space-saving design.

For the aforementioned arrangement, featuring two swivelling engines at the wing tips of an aircraft, long lever linkages are provided that are supported at points in the aircraft far away from each other and operated from remote places. The present invention, however, is intended to provide for a device centrally arranged, with its major components, at one place, particularly in the cockpit of the aircraft. Contrary to the previous arrangement not permitting superpositioning of several types of movements, said arrangement is supposed to be particularly suitable for this purpose.

This invention thus applies to a transmission comprising two hand levers designed for both counter-rotation type and same directional pivoting, two controls responding to different operational values, and two transfer levers located between the controls and the hand levers.

Basically, this invention is characterized by the fact that the hand levers are pivot-mounted on a common axle and coupled to one end of the transfer levers arranged on the axle via an eccentric drive, whereby the amount of relative offset of the eccentric cams in a circumferential direction is determined by the requirement of the hand levers for counter-rotation type pivoting. In this case, one control will turn the eccentric cams about the common axis, by alternate super-positioning, to generate counter-rotation type motion components of the hand levers, while the transfer levers will rest against the other control at the end opposite the coupling end. However, if same directional motion components are required for the hand levers, then the transfer levers of the last-mentioned control will pivot about the axes of the eccentric cams retained by the aforementioned control.

One embodiment of this invention utilizes basically simple and proven components built up to form a compact unit to be accommodated, e.g., in the cockpit of an aircraft. The two hand levers could carry out a common, same directional basic movement, with relative movements of the hand levers being superimposed.

The coupling between hand levers and transfer levers is detachable, particularly to allow pivoting of the hand levers independent of the transfer levers, which, e.g., is the pilot's task under given operating conditions.

In order to permit all movements to be carried out without any danger of sticking in the transmission, in this invention, the hand levers are mounted on the axle in spherical joints, thus allowing adjustment normal to their pivoting direction, and the linking levers are mounted on spherical joints and coupled to a member actuated by a control.

The design of the transmission includes eccentric cams arranged on a hollow shaft surrounding the axle used for mounting of the hand levers.

To meet the operational requirements, similar type eccentric cams are used that are rigidly attached to the hollow shaft at a definite, relative angular offset.

If, however, substantially different operational conditions are to be expected, then similar type eccentric cams can be arranged on the hollow shaft with a provision for relative adjustment in a circumferential direction.

Especially in the last-mentioned case, gate type guides can be used in lieu of the eccentric cams, whereby the sliding blocks would move in gates with sections of different cam slopes; thus, in some of the movement ranges of the hand levers, the same direction motion impulse would be predominant, while in other ranges, the counter-rotation type motion impulse would be overriding; or in some movement ranges, the hand levers would cover distances of equal lengths, but in an opposite direction, while in other movement ranges, they would carry out counter-rotation type movements over distances of different lengths.

In another embodiment of this invention, the couplings between hand levers and transfer levers may feature bolts on either lever type that engage with longitudinal slots in the other levers, and that are retained by means of bow springs allowing them to slide in the direction of the longitudinal slots.

Finally, the ends of the two transfer levers are combined on one side in the plane of its control, in order to be able to operate the control while being close together with the connection between the transfer levers and the control featuring longitudinal slots and lateral trunnions for the transfer levers. This arrangement will ensure that sidewise evading movements of the control are prevented. In this case, no moment is applied to the control, and any movements of the control affecting the accuracy of the transmission are thus precluded, thereby accounting for relative movements caused by the eccentric support of the transfer levers.

The means by which the objects of the invention are obtained are described more fully with reference to the accompanying drawings in which:

FIG. 2 is a partial cross-sectional view through FIG. 1;

FIG. 3 is a cross-sectional view taken on the line III—III of FIG. 2;

FIG. 4 is a cross-sectional view taken on the line IV—IV of FIG. 3; and

FIG. 5 shows another embodiment of this invention in a view corresponding to a part of FIG. 1.

Figure 1:
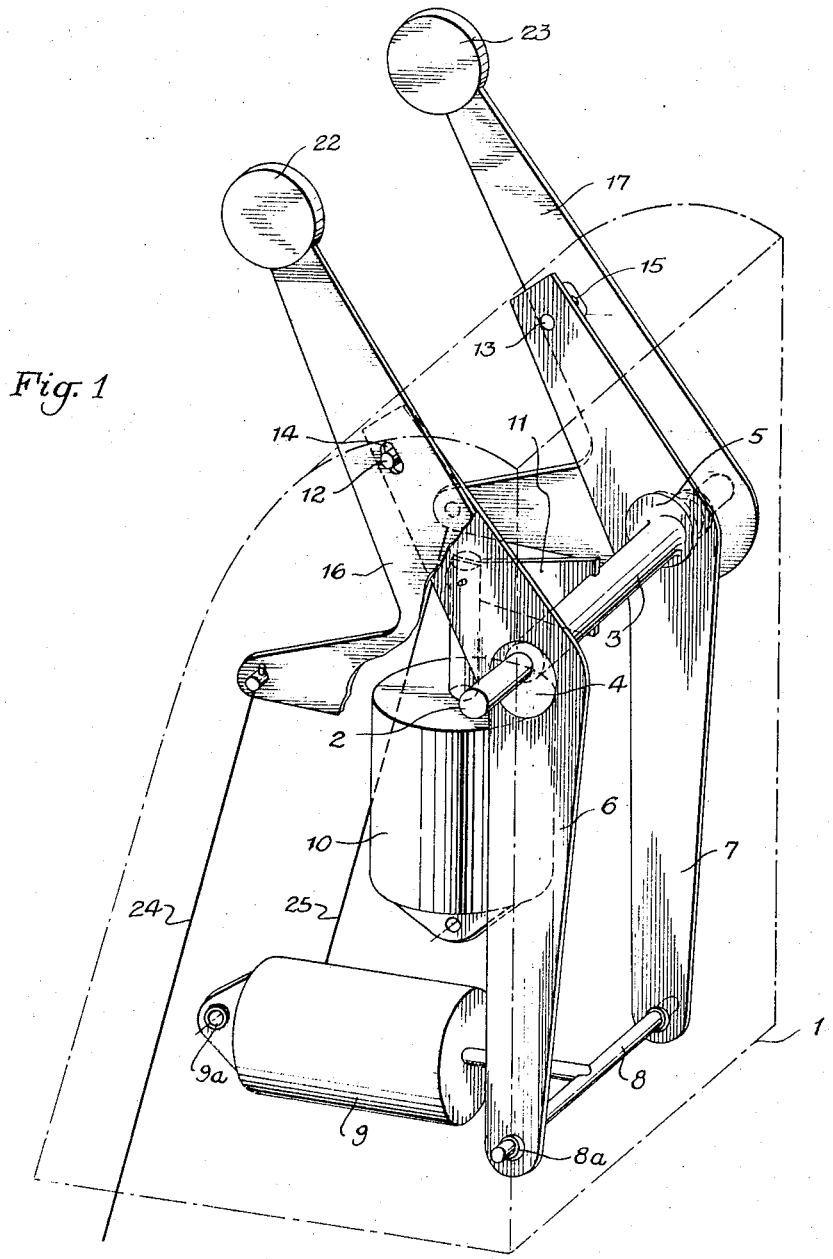
FIG. 1 is a perspective view partly in section of an arrangement of the invention.

Housing 1 of the control pedestal of an aircraft power plant incorporates an axle 2. Fitted on this axle 2 is a sleeve 3 that is free to rotate about its axis and having two eccentric cams 4, 5 on either end, which are offset by 180° relative to each other. Each eccentric cam is provided with a double-arm, transfer levers 6 and 7, respectively. The lower ends of the two levers incorporate a coupling link 8 that is mounted in spherical bearings 8a and actuated by the first governor control element 9 of a control unit. A second torque control element 10 of the same control unit operates on a single-arm lever 11 and on the eccentric cam of sleeve 3, respectively. The two transfer levers 6, 7 feature trunnions 12, 13 inserted near their upper ends. Each trunnion 12, 13 is to engage with recess 14, 15 in hand lever 16, 17. Recesses 14, 15 are elongated holes. When the two trunnions 12, 13 engage with recesses 14, 15 simultaneously, or independent of each other, they are retained in this position by bow springs 18, 19 fitted to hand levers 16, 17 and engaging with annular grooves in trunnions 12, 13. To permit engagement and disengagement between automatic levers 6, 7 and hand levers 16, 17, the latter are pivot-mounted in ball joint bearings 20, 21 on axle 2. The two hand levers 16, 17 are designed as bellcranks, one leg of which being provided with recess 14 and 15, respectively, and operated by the pilot on knobs 22, 23, while the other legs are connected to the two components of a transfer linkage 24, 25 leading to either governor of the two combustion engines of the power plant that are working on a common output shaft. Actuating movement of the governor control 9, the cylinder of which being pivot-mounted in housing 1 by spherical joint 9a and the piston of which acting on coupling rod 8, is effected as a function of the governor of the common output shaft of the two combustion engines. Actuating movement of the torque control, the cylinder of which again being pivot-mounted in housing 1 and the piston of which acting on sleeve 3, is effected as a function of the torque transmitters of the two combustion engines.

For automatic control of the two combustion engines, the trunnions 12, 13 of levers 6, 7 are engaged with the recesses 14, 15 of the two hand levers 16, 17 so that hand levers 16, 17 and levers 6, 7 are fully connected. When the tachometer generator senses a deviation of the speed of the common output shaft of the combustion engines from the nominal speed, then the governor control 9 will react and adjust the two levers 6, 7, with sleeve 3 remaining satisfactory. Via the two hand levers 16, 17 as well as via the transfer linkages 24, 25, a same directional actuating movement of the governors of both combustion engines and a same directional change in the machine speed of both combustion engines is thus effected, resulting in a restoration of the output shaft r.p.m. to the nominal value.

When the torquemeter transmitters of both combustion engines sense a different torque output of both combustion engines, then the torque control 10 will react and cause the sleeve 3 to turn relative to axle 2 with its eccentric cams 4, 5, relative to levers 6, 7. Due to the 180° offset of the similar eccentric cams 4, 5, the levers 6, 7 will pivot about coupling rod 8 by the same amounts, yet in an opposite direction, and cause via hand levers 16, 17 as well as transfer linkages 24, 25 the governors of both combustion engines to perform actuating movements in the opposite sense of rotation, thus again matching the torque output of both combustion engines to that of the working shaft.

During actual operation of the power plant of an aircraft, normally, the two described control functions will, more or less, overlap continuously so that the described lever movements will represent components of a motion resultant.

The two hand levers 16, 17 are to be disengaged from the transfer levers 6, 7 independent of each other and simultaneously, respectively, so that torque and speed control on the output shaft may be effected for one combustion engine or both engines automatically and manually, respectively.

To permit adaptation of the linkage to the different operating conditions, the length of the linkage is adjustable, which may be effected by adjustment of the cylinders of governor control 9 and of torque control 10 relative to housing 1 in the direction of the relevant cylinder longitudinal axis.

The recesses 14, 15 designed as elongated holes, of hand levers 16, 17 allow for relative movements of the levers interconnected via trunnions and slots, these relative movements being due to the eccentric support of levers 6, 7. The relative movement of both levers 6 and 7 between each other, being twice as large, is taken up at the point of force application of governor control 9 by its spherical bearing in such a manner that it performs tilting movements about its own axis, when torque control 10 acts on the eccentric support of levers 6 and 7. The cylinder of governor control 9 is thus connected to housing 1 in a manner allowing it to be moved not only in the direction of the cylinder longitudinal axis, but also permitting it to be pivoted for three-dimensional movements. Due to the spherical point 9a between the governor control 9 and levers 6, 7 in the connecting supports between these levers and coupling link 8, the lever bearings will remain free of thrust forces, which is for the benefit of control accuracy.

In the arrangement of FIG. 5, the lower ends of the two levers 6 and 7 are combined in the longitudinal vertical plane and in the horizontal plane of governor control 9, contrary to FIG. 1, so that they are close together, but without being connected to each other. With lateral trunnions 26, a yoke 27 on the moving part of governor control link 9 projects into vertical slotted holes 28 at the lower ends of the transfer levers. For the remainder, the design of the arrangement of FIG. 5 is similar to that previously described in FIGS. 1 to 4. This arrangement thus is free of any moments liable to adversely affect control accuracy, and it can, therefore, be successfully employed in such applications where extreme control accuracy is required.

Having now described the means by which the objects of the invention are obtained, I claim:

1. A control transmission comprising a first control element responsive to a first operating condition, a second control element responsive to a second operating condition, an axle, a pair of hand lever means pivotally mounted on said axle, transfer lever means connecting said first control element to said hand lever means, respectively, cam means mounted on said axle and engageable with each of the pair of hand lever means for the counter rotation of said hand lever means, and means joining said second control element to said cam means for turning said cam means to cause the counter rotation of said hand lever means while said hand lever means are adjustable in the same direction by the first control element.

2. A transmission as in claim 1, further comprising detachable connecting means joining said transfer lever means to said hand lever means for permitting the independent operation of said hand lever means.

3. A transmission as in claim 2, further comprising ball joint means pivotally mounting said hand lever means of said axle for the movement of said hand lever means transversely of their pivotal movement, a coupling link joined to said first control element, and spherical bearing means joining said coupling link to said transfer lever means.

4. A transmission as in claim 3, said cam means comprising a hollow shaft rotatable on said axle, and cams joined to said shaft.

5. A transmission as in claim 4, said cams being rigidly fixed to said shaft and being similar and angularly offset from each other by a predetermined amount.

6. A transmission as in claim 4, said cams being similar and angularly adjustable with respect to each other.

7. A transmission as in claim 4, said cam means comprising slide block means movable in gate guides over different cam slopes for a predominant movement of said hand lever means in the same direction during a given movement range, while in the other ranges and through equally large distances the movement is in counter rotation in different lengths.

8. A transmission as in claim 5, said transfer lever means being detachably connected to said hand lever means by trunnions on said transfer lever means engaged in slots in said lever means, and bow spring means for slidably retaining said trunnions in said slots.

9. A transmission as in claim 1, said transfer lever means being connected to said first control element by a pair of legs brought together at one end on the longitudinal axis of said first control element.

10. A transmission as in claim 9, further comprising a yoke joined to said first control element, and slot and trunnion means for connecting said yoke to the end of said legs.

References Cited

UNITED STATES PATENTS 2,437,546  3/1948  Meripol  74—471 XR
2,452,064  10/1948  Mayrath  60—97

FRED C. MATTERN, JR., *Primary Examiner.*

JAMES A. WONG, *Assistant Examiner.*

U.S. Cl. X.R.

74—471